(12) United States Patent
Leiber

(10) Patent No.: US 7,872,389 B2
(45) Date of Patent: Jan. 18, 2011

(54) ELECTRIC DRIVE HAVING A BELL-SHAPED ARMATURE AND EXTERNAL PERMANENT MAGNET ELEMENTS

(75) Inventor: Thomas Leiber, Munich (DE)

(73) Assignee: IPGATE AG, Zurich (CH)

( * ) Notice: Subject to any disclaimer, the term of this patent is extended or adjusted under 35 U.S.C. 154(b) by 120 days.

(21) Appl. No.: 12/064,690

(22) PCT Filed: Jul. 15, 2006

(86) PCT No.: PCT/EP2006/006951

§ 371 (c)(1),
(2), (4) Date: May 6, 2008

(87) PCT Pub. No.: WO2007/022833

PCT Pub. Date: Mar. 1, 2007

(65) Prior Publication Data

US 2008/0231134 A1        Sep. 25, 2008

(30) Foreign Application Priority Data

Aug. 25, 2005    (DE) .................. 10 2005 040 389

(51) Int. Cl.
*H02K 21/12*        (2006.01)
(52) U.S. Cl. .................. 310/156.28; 310/156.12
(58) Field of Classification Search ................. 310/156.12–156.14, 156.28, 156.34
See application file for complete search history.

(56) References Cited

U.S. PATENT DOCUMENTS 5,345,133 A        9/1994    Satake et al.

6,920,682 B2 *    7/2005    Ku et al. .................. 29/596
2004/0140725 A1    7/2004    Takahashi (Continued)

FOREIGN PATENT DOCUMENTS

DE        4126137 A1    2/1992

(Continued)

OTHER PUBLICATIONS

PCT/EP2006/006951, International Search and Examination Reports, Nov. 7, 2006 and Nov. 28, 2007.

(Continued)

*Primary Examiner*—Nguyen N Hanh
(74) *Attorney, Agent, or Firm*—Connolly Bove Lodge & Hutz LLP

(57) ABSTRACT

The invention relates to an electric drive having a stationary outer and inner stator and a rotor, a plurality of permanent magnet elements being disposed on the rotor for producing an excitation flux and at least one electrical field coil being provided. The rotor comprises at least one bell-shaped part having a cylindrical wall and a base wall. Said base wall is mounted perpendicularly and the cylindrical wall coaxially in relation to the axis of the rotor shaft. The base wall is connected to the rotor shaft for transmitting a force or a torque. The permanent magnet elements rest on one side on the cylindrical wall and are secured side by side to the rotor of the drive in the peripheral direction. The permanent magnets, interact with the outer and inner stator, to give magnetic circuits which completely extend through the cylindrical part of the rotor in the radial direction, the permanent magnet elements being arranged only on the exterior of the cylindrical wall.

36 Claims, 5 Drawing Sheets

U.S. PATENT DOCUMENTS

Figure 2:
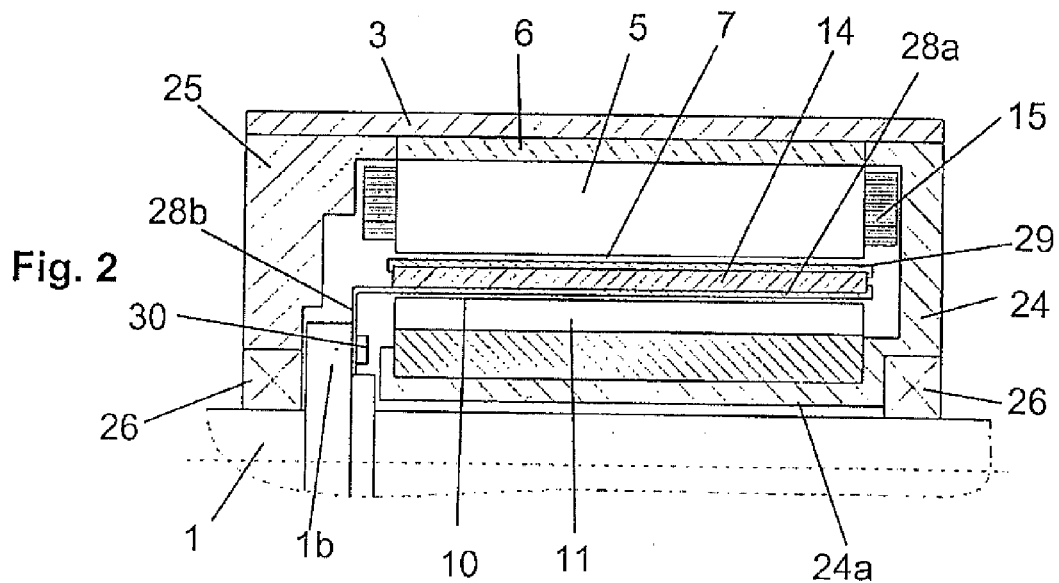

2004/0155546 A1* 8/2004 Stevens et al. ......... 310/156.01
2004/0174083 A1* 9/2004 Han et al. ............... 310/156.12
2008/0197738 A1* 8/2008 Leiber et al. ........... 310/156.26

FOREIGN PATENT DOCUMENTS

| DE | 19539583 | A1 | 4/1997 |
|---|---|---|---|
| DE | 19753916 | A1 | 6/1999 |
| EP | 1492213 | | 12/2004 |
| FR | 2691592 | A1 | 11/1993 |
| WO | 92/22122 | | 12/1992 |
| WO | 93/15547 | | 8/1993 |
| WO | 02/093719 | | 11/2002 |
| WO | 2006/000260 | | 1/2006 |

OTHER PUBLICATIONS

DE 10 2005 040 389.1—German Search Report, Jun. 30, 2006.
International Preliminary Report on Patentability issued in corresponding International Application No. PCT/EP2006/006951 mailed Jun. 12, 2008.

* cited by examiner

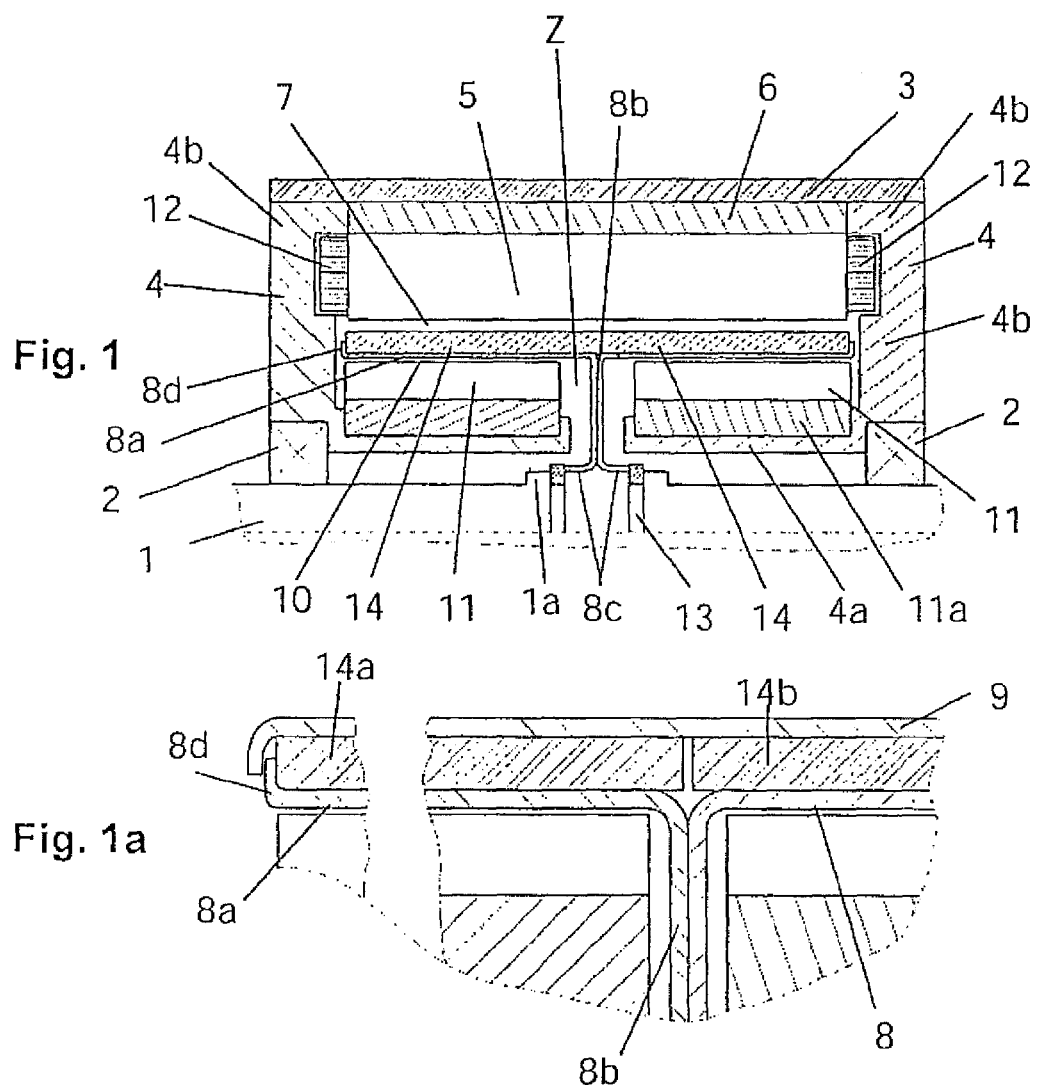

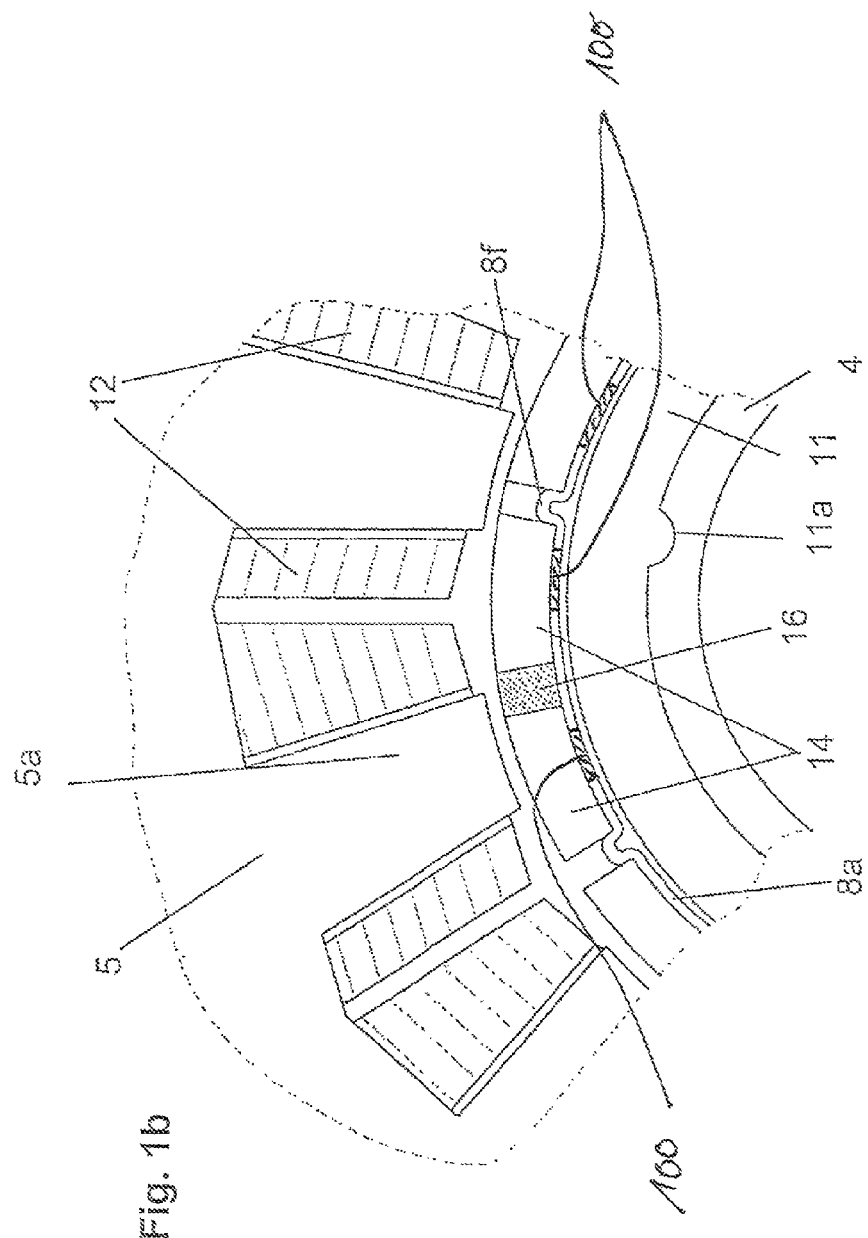

ELECTRIC DRIVE HAVING A BELL-SHAPED ARMATURE AND EXTERNAL PERMANENT MAGNET ELEMENTS

CROSS-REFERENCE TO RELATED APPLICATIONS

This application is a 35 U.S.C. §371 application of International Application No. PCT/EP2006/006951, filed Jul. 15, 2006, claiming priority of German Application No. 102005 040 389.1, filed Aug. 25, 2006, the entire disclosures of which are incorporated herein in their entities.

The present invention relates to an electric drive as defined in the preamble of Claim 1.

This invention is based on the disclosure content of International Patent PCT/EP2005/002441. In amplification of PCT/EP2005/002441 owned by the same applicant, the efficiency of the magnetic circuit is to be further improved in this invention. This is achieved by the fact that the cup is implemented as a thin-walled inner cup, made more particularly of ferromagnetic material, and the magnets are mounted on the exterior of the cup.

The design of the bell-shaped rotor illustrated in FIG. 1 of PCT/EP2005/002441 has the disadvantage that the magnetic flux is short-circuited across the cup to the stator if the cup is made of ferromagnetic material. This leakage flux leads to a reduction in torque. If the cup is not made of non-ferromagnetic material, the air gap is increased. This also leads to magnetic leakages.

On the contrary if the cup is made as an inner cup of ferromagnetic material, the cup actually constitutes a magnetic conductor and it is guaranteed that the magnetic flux of the excitation yoke infiltrates the permanent magnets without significant harmful leakage flux. On account of the inner cup design in comparison to the outer cup design, the torque is advantageously increased by approx. 20-30%.

A further advantage of the inner cup lies in the fact that with the same amount of installation space the force-effective length of the permanent magnets can be further increased. While in the case of the outer cup—particularly if configured as a two-sided cup—the cup base wall requires separation of the permanent magnets, in the case of the inner cup the cup can be fitted in the axial direction over its entire length with permanent magnets.

With heavy load, for example high rpm, complete encapsulation or shrouding of the magnets is advantageous, so that the magnets are prevented from breaking off or coming off in splinters in the radial direction. This can be achieved for example by a non-magnetic material, for example a foil or a heat-shrinkable casing and/or by bonding to the surface.

The invention also proposes that two bell-shaped parts or cups are arranged axially side by side on the shaft and together form the rotor. In this case the base-shaped walls of two adjacent cups can be formed by a common base wall. It is equally possible that the cylindrical wall of two adjacent bell-shaped parts is formed by a common casing, the force then being transmitted to the shaft from the cylindrical wall via a common or by two or several base walls.

It is naturally equally possible, in one bell-shaped part, to arrange a plurality of permanent magnets side by side in the axial direction. The same also applies to the configuration of several bell-shaped parts arranged side by side, which can have a plurality of permanent magnets likewise arranged side by side in each case. The advantage of a plurality of magnets arranged together in a row at short distances lies in the fact that the different thermal coefficients of expansion between the permanent magnets and the cup do not negatively affect one another. Also the axial length of the bell-shaped parts arranged side by side may be different.

Advantageous embedding with simultaneous easy assembly can be achieved by the fact that the permanent magnets in each case rest on one side on an indentation or corrugation of the cup and in each case two adjacent magnets are fixed together in the gap by a filler material with large thermal coefficients, for example casting resin, cement. The filler material guarantees that the temperature will be compensated when the motor heats up. Preferably the permanent magnet elements are bonded to the cup contact face. This is necessary since the permanent magnets possess a very small coefficient of expansion.

The bell-shaped parts described above are configured similarly to the cups of the prior art bell-shaped rotors. The cylindrical wall however is supported on the shaft in the radial direction only by means of the base wall.

The drive is used either as a continuously rotating motor, stepping motor or segment motor. Likewise it is also possible to use the drive as a linear drive. With the linear drive the rotor is not rotated about its axis, but is moved back and forth in the axial direction by the magnetic field.

Also it is possible that the coils of the outer stator and the permanent magnets of the rotor are arranged as in the case of a transverse flux machine. Such a transverse flux machine is described for example in the "Handbook of small electric motors", Carl Hanser Verlag. The inner stator is to be configured similarly in this case.

Figure 3:
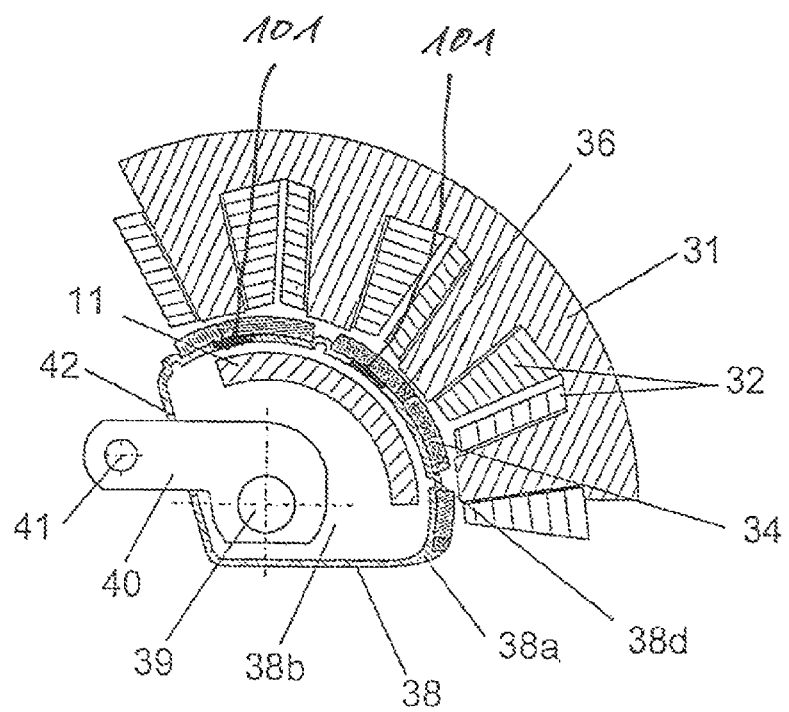
Figure 4:
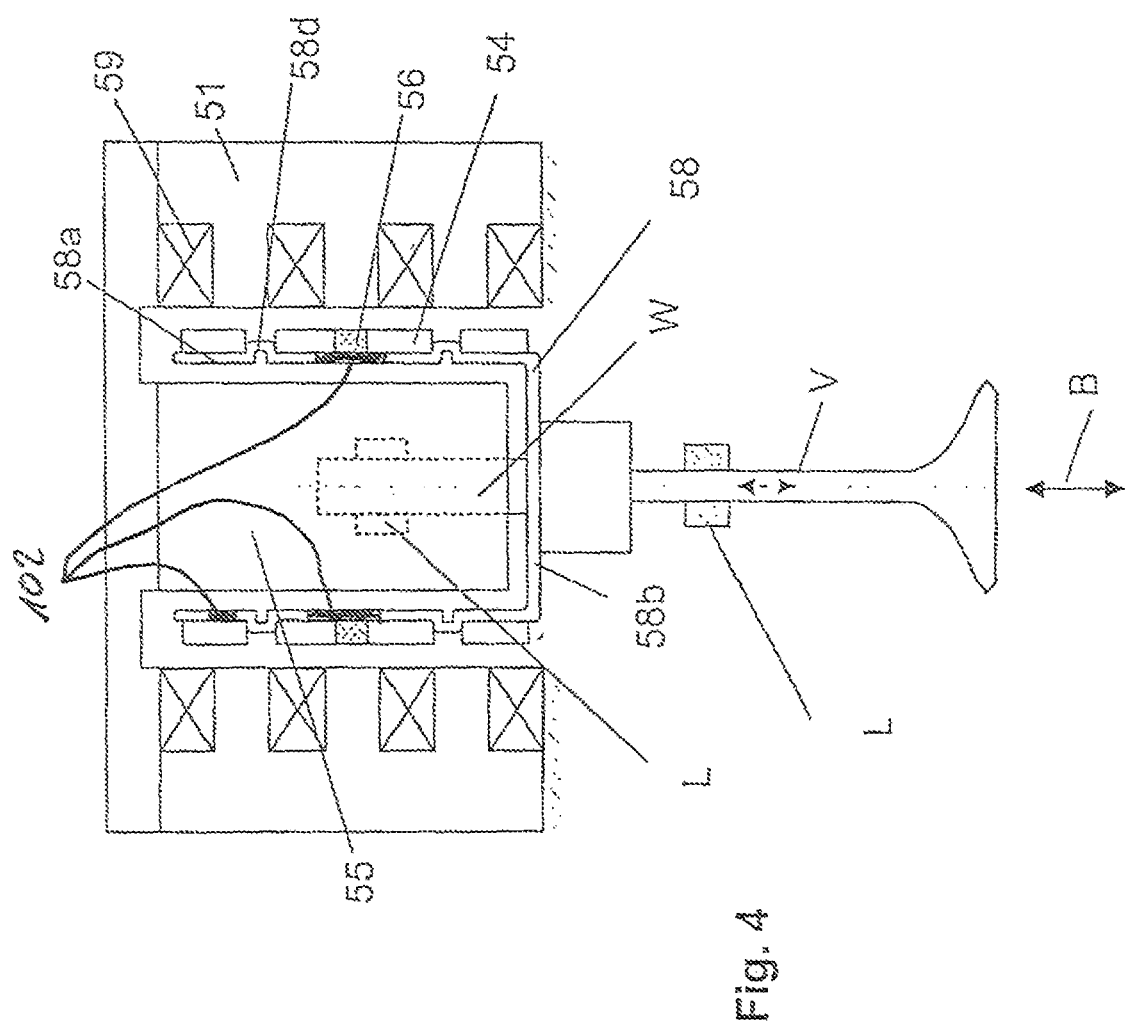

Various configurations of the drive according to the invention are described in detail below on the basis of drawings, wherein:

FIG. 1: shows an electric drive according to the invention with two cups as inner rotors;

FIG. 1a: shows a detailed illustration of the design of the cups;

FIG. 1b: shows a cross sectional illustration through a cup;

FIG. 2: shows a drive with only a one-sided cup;

FIG. 3: shows a drive according to the invention as a segment motor;

FIG. 4: shows a drive according to the invention as a linear motor.

FIG. 1 shows a longitudinal section through a first embodiment of a drive according to the invention. A drive shaft 1, which is rotatably mounted with two antifriction bearings 2 in the housing of the drive, is provided in order to transmit the torque produced in the drive. The housing consists of the two housing halves 4 and the housing cover 3. The housing halves 4 have cylindrical walls 4a, which are moulded on the front side housing walls 4b. The cylindrical walls 4a support the inner stator 11, 11a, which is split into two and forms a gap Z in the centre. The base walls 8b of the bell-shaped parts 8 extend through the gap Z and are supported with their collar 8c directed outwards, which through a corresponding profile guarantees the transmission of torque between rotor and shaft. In the axial direction the bell-shaped parts 8 are prevented from moving axially by means of snap-rings 13, which positively lie in grooves of the central area 1a of the shaft 1. The bell-shaped elements face each other with their disk-shaped base walls 8b, so that the inner stators 11, 11a, which are located on the cylindrical walls 4a of the housing parts 4, into which cups with the permanent magnets 14 arranged thereon, can be fitted axially from outside.

Each bell-shaped part 8 has a cylindrical wall 8a moulded externally in the radial direction on the base wall 8b. The permanent magnets 14 are mounted on the exterior of the cylindrical wall 8a. The cup is upturned at the outer end 8d, which fixes the magnets in the axial direction and contributes to significant reinforcement.

The drive according to the invention illustrated in FIG. 1 is configured as a so-called inner rotor, that is to say only the outer stator 5, 6 bears electrical field coils 12. The inner stator 11, 11a is only used for the magnetic feedback. An air gap 10 is provided between the cup and the inner stator 11, while there is a second air gap 7 between the cup and the outer stator 5. Preferably the air gaps 7 and 10 are of equal size. The poles of the outer and inner stators are configured in such a manner that they interact with the permanent magnets 14 located in the bell-shaped part 8 to give magnetic circuits, which completely extend through the cylindrical wall 8a and shroud 9. The permanent magnets 14 at the same time provide a magnetic bias.

The permanent magnets 14 are bonded to the exterior of the cylindrical wall 8a. However they can also be secured differently to the cylindrical wall.

FIG. 1a only shows sections of the rotor, which has a cover or shroud 9 of the magnets. The cover is preferably implemented as a foil or heat-shrinkable casing, and ensures that the permanent magnets are prevented from coming off in splinters or breaking off if heavy radial loads, for example centrifugal forces due to high rpm, act on the rotor. The cover preferably consists of a very thin wall so that the distance between the permanent magnets and the excitation stator is as short as possible. Furthermore it is illustrated that the magnets 14a, 14b are constructed from multiple parts in the axial direction. For cost reasons it is expedient that as many magnets as possible are arranged in the axial direction so that the ratio of the length of the magnets to their width and height is as low as possible. In addition the different coefficient of expansion of the permanent magnets and the cup can therefore be better controlled.

FIG. 1b shows a cross section through a segment of the rotor. The cylindrical wall 8a of the outside cup has corrugations or bulges 8f, on which the permanent magnet elements 14 rest on one side. The remaining gap between the magnets is filled with a filler material, for example casting resin 16, which compensates the expansion differences of the individual parts between each other in the case of variations in temperature. As is generally known, the magnets have very small or negative coefficients of expansion transversely to the magnetization direction. Furthermore a section of the excitation yoke 5, which has cone-shaped limbs 5a and bears the electrical field coils 12, is illustrated in FIG. 1b. The inner yoke 11 is preferably constructed from cylindrical laminations without poles. The avoidance of poles in the case of the inner yoke acts advantageously on the detent torque. The cone-shaped configuration of the excitation yoke limbs permits high magnetomotive forces as well as simple coil assembly. The inner and also the outer yoke have a corresponding profile, which extends into the housing 4 and is thus locked against rotation. As also shown in FIG. 1b, the cylindrical wall within the region of the corrugations or bulges 8f may have one or more window-like recesses 100, which may provide for weight reduction or for injecting filler material.

FIG. 2 shows a further embodiment according to the invention, with only one cup 28, which with its base wall 28b is secured by mounting means 30 on the area 1b of the shaft 1 in a rotationally fixed manner. The cup 28 encompasses the inner stator 11 over its entire axial length. The inner stator 11 is mounted on a cylindrical wall 24a of the right housing part 24. The housing itself is closed by the cylindrical lateral surface 3 and the further housing part 25, the shaft 1 being rotatably mounted in the housing via bearing 26. The cup 28 has a cylindrical wall 28a, against which the permanent magnets 14 rest on the exterior and with the outer stator 5 form an air gap 7. From the outside the permanent magnets are held by means of a heat-shrinkable casing 29. A second air gap 10, which is preferably just as large as the air gap 7, is provided between cup 28 and feedback or inner stator 11. Through a not illustrated bearing in the housing 24a for the shaft, the housing 25 on this side can be formed in a closed manner.

FIG. 3 shows a further possible configuration of the drive according to the invention, this being designed as a segment motor. The segment motor has an asymmetrical cup 38. The magnets 34 are arranged on the exterior of the cup and are supported on the corrugations 38d in the peripheral direction, wherein temperature compensation elements 36 are arranged between the adjacent permanent magnets 34. As shown, the cup 38 may include one or more window-like recesses 101 in the region of the corrugations 38d. The outer stator 31 bears the electrical field coil 32. The inner stator 11 is implemented as a cylindrical segment. The cup 38 is connected to the shaft 39 by means of its base wall 38b on the transmission link 40. The force can be transmitted from the cylindrical cover 38a and the transmission link 40 either at the end of a cup or between two cups. For this purpose the cup 38 has a corresponding recess 42. From the transmission link 40 a not illustrated coupling can be connected via the bearing boring 41.

FIG. 4 shows a further embodiment of the drive according to the invention as a linear drive. In the illustrated embodiment the outer stator 51 bears one or more electrical field coils 59. In this configuration the magnets 54 are arranged on the exterior of the cup 58, being spaced apart by temperature compensation elements 56 and held in position by corrugations or bars 58d in the cup and an optional and outwardly directed collar (not illustrated). The cylindrical wall 58a is connected to the shaft W via the base wall 58b. There is an air gap between the cylindrical exterior face of the cylindrical wall 58a and the inner stator 51. Likewise there is an air gap between the outer stator 55 and the permanent magnet elements 54. The magnetic flux extends through the cylindrical wall 58a as well as both air gaps and interacts with the permanent magnet elements 54 as well as both stators to give a plurality of magnetic circuits. One or more window-like recesses 102 may be provided in the region of corrugations or bars 58d.

Also in the case of the drive in accordance with FIG. 4 a shroud—not illustrated—can be optionally provided.

The shape of the cup can be round, oval or also have an oblong or box profile. It is made of ferromagnetic material and displaceably mounted in the axial direction, by means of the two bearings L and the shaft W. A valve V of a combustion engine, which periodically opens or closes by the rotor moving up and down, can be fitted on the shaft W for example.

Inasmuch as the magnets on their face in contact with the cylindrical wall are formed flat, the contact area of the cylindrical wall should likewise be formed flat, so that the permanent magnet elements rest on the cylindrical wall over their entire surface. Consequently magnets, which are geometrically simple and economic to produce, can be bonded to the wall easily and over the entire surface.

The invention claimed is:

1. An electric drive with a permanent outer and inner stator and a rotor, a plurality of permanent magnet elements arranged on the rotor for producing an excitation flux being provided and at least one electrical field coil, the rotor comprising at least one bell shaped part, having a cylindrical wall and a base wall, the base wall being mounted perpendicularly and the cylindrical wall coaxially in relation to the axis of the rotor shaft, and the base wall being connected to the rotor shaft for transmitting a force or a torque, the permanent magnet elements resting on one side on the cylindrical wall and secured side by side to the rotor of the drive in the peripheral direction, the permanent magnet elements interacting with the outer and inner stator to give magnetic circuits, which completely extend through the cylindrical part of the rotor in the radial direction, wherein the permanent magnet elements are arranged only on the exterior of the cylindrical wall, wherein the cylindrical wall is integral with the base wall, wherein the cylindrical wall is made of a ferromagnetic material, wherein the electric drive further comprises an air gap between the wall and the magnetic feedback part forming the magnetic feedback or inner stator, and wherein the outer stator bears at least one electrical field coil.

2. The electric drive according to claim 1, wherein the permanent magnet elements are arranged in the axial direction parallel to the cylindrical wall.

3. The electric drive according to claim 1, wherein the cylindrical wall has axially running and radially outwardly directed bulges or corrugations, on which the permanent magnet elements are supported or rest.

4. The electric drive according to claim 3, wherein the gap between the bulges or corrugations and the permanent magnet elements is filled with a filler material.

5. The electric drive according to claim 1, wherein the cylindrical wall is secured to the base wall.

6. The electric drive according to claim 1, wherein the cylindrical wall within the region of the corrugations has window-like recesses for weight reduction or for injecting the filler material.

7. The electric drive according to claim 6, wherein the casing has a radially inwardly pointing collar or collar sections at least on one of the two surrounding sides.

8. The electric drive according to claim 1, wherein the rotor is encased on the exterior by an enveloping cylindrical part, wherein the cylindrical part is particularly a thin-walled casing, whose thickness is less than the thickness of the cylindrical wall.

9. The electric drive according to claim 8, wherein the enveloping cylindrical part is made of a non-ferromagnetic material.

10. The electric drive according to claim 1, wherein the drive has two cylindrical walls, which are arranged axially side by side and on which permanent magnet elements rest on the exterior, wherein at least one base wall is arranged between the cylindrical walls.

11. The electric drive according to claim 10, wherein each cylindrical wall with a respective associated base wall forms a bell-shaped part.

12. The electric drive according to claim 11, wherein the two base walls contact one another and are connected to each other in particular.

13. The electric drive according to claim 10, wherein the cylindrical walls are secured to the one base wall or the at least one cylindrical wall is integrally formed with the base wall and the other cylindrical wall is connected to the base wall.

14. The electric drive according to claim 10, wherein the two cylindrical walls bearing the permanent magnet elements are encompassed on the exterior by a common in particular thin-walled casing or cover.

15. The electric drive according to claim 1, wherein the shaft passes through the at least one base wall and the base wall is especially positively secured to the shaft.

16. The electric drive according to claim 1, wherein several bell-shaped parts having permanent magnet elements are located side by side on a shaft.

17. The electric drive according to claim 16, wherein two bell-shaped parts are assigned to a common outer and inner stator.

18. The electric drive according to claim 16, wherein at least one outer stator and inner stator are assigned to the several bell-shaped parts.

19. The electric drive according to claim 1, wherein the drive is designed as a segment motor, wherein the bell-shaped part is only one segment of a complete cup.

20. The electric drive according to claim 1, wherein magnetic force pivots or rotates the rotor about its axis.

21. The electric drive according to claim 1, wherein magnetic force moves the rotor linearly back and forth in the axial direction of the rotor axis.

22. The electric drive according to claim 1, wherein a plurality of permanent magnet elements are arranged on the exterior of the cylindrical wall in the axial direction and are spaced apart over the periphery, side by side, in particular facing each other.

23. The electric drive according to claim 22, wherein the permanent magnet elements rest on radially surrounding and/or axially extending bulges or corrugations, which are formed outwards on the cylindrical wall in the radial direction.

24. The electric drive according to claim 1, wherein the base wall has a thickness, which is different from the cylindrical wall of the bell-shaped part, wherein the base wall is thicker than the cylindrical wall.

25. The electric drive according to claim 1, wherein the base wall is constructed from, multiple parts.

26. The electric drive according to claim 1, wherein the cross-sectional shape of the permanent magnet elements is square.

27. The electric drive according to claim 1, wherein the cylindrical wall on its side facing away from the base wall has a collar pointing in the radial direction.

28. The drive according to claim wherein the inner stator is formed by laminations.

29. The electric drive according to claim 1, wherein the shape of the inner stator is cylindrical.

30. The electric drive according to claim 29, wherein the inner stator does not have any shaped poles.

31. The electric drive according to claim 1, wherein the cross-sectional shape of the inner stator is in the form of a circular segment.

32. The electric drive according to claim 1, wherein the outer stator has cone-shaped poles.

33. The electric drive according to claim 1, wherein, the cross-sectional shape of the cup or the bell-shaped part of the rotor is annular, oval, oblong or in the form of a circular segment.

34. The electric drive according to claim 1, wherein the cylindrical wall is flattened, at least externally in the areas on which the permanent magnet elements rest.

35. The electric drive according to claim 1, wherein the radial thickness of the permanent magnetic elements is larger than the thickness of the cylindrical wall of the bell-shaped part.

36. The electric drive according to claim 1, wherein the base wall has a thickness which is equal to the thickness of the cylindrical wall of the bell-shaped part.

* * * * *